United States Patent
Reich

(10) Patent No.: US 8,880,238 B2
(45) Date of Patent: Nov. 4, 2014

(54) METHOD FOR ASSISTING A PERSON IN PLANNING A JOURNEY WITH AN ELECTRIC VEHICLE, AND MOTOR VEHICLE HAVING A NAVIGATION DEVICE

(75) Inventor: Andreas Reich, Buxheim (DE)

(73) Assignee: Audi Aktiengesellschaft, Ingolstadt (DE)

( * ) Notice: Subject to any disclaimer, the term of this patent is extended or adjusted under 35 U.S.C. 154(b) by 0 days.

(21) Appl. No.: 14/234,071

(22) PCT Filed: Feb. 25, 2012

(86) PCT No.: PCT/EP2012/000819
§ 371 (c)(1),
(2), (4) Date: Jan. 21, 2014

(87) PCT Pub. No.: WO2013/013729
PCT Pub. Date: Jan. 31, 2013

(65) Prior Publication Data
US 2014/0156108 A1   Jun. 5, 2014

(30) Foreign Application Priority Data

Jul. 22, 2011   (DE) .......................... 10 2011 108 381

(51) Int. Cl.
*G01C 21/34*   (2006.01)
*G01C 21/36*   (2006.01)

(52) U.S. Cl.
CPC ........ *G01C 21/3469* (2013.01); *G01C 21/3682* (2013.01)
USPC .......................................................... 701/1

(58) Field of Classification Search
CPC .......... G06F 17/00; G06Q 50/28; G08G 1/00; B60L 2240/72; B60L 11/00; B60L 2260/52; Y02T 90/163; Y02T 10/7088
USPC ............................................................. 701/1
See application file for complete search history.

(56) References Cited

U.S. PATENT DOCUMENTS 5,539,399 A  *  7/1996  Takahira et al. ......... 340/995.27
5,568,390 A     10/1996  Hirota et al.
(Continued)

FOREIGN PATENT DOCUMENTS

DE   195 19 107    4/1996
DE   198 07 291    8/1999
(Continued)

OTHER PUBLICATIONS

International Search Report issued by the European Patent Office in International Application PCT/EP2012/000819 on May 21, 2012.

*Primary Examiner* — Thomas Tarcza
*Assistant Examiner* — Alex C Dunn
(74) *Attorney, Agent, or Firm* — Henry M. Feiereisen LLC.

(57) ABSTRACT

A person is to be assisted in planning a journey with an electric vehicle. Information relating to an overall region with destinations within reach of the electric vehicle are outputted. For this purpose, a starting region is determined, from which a boundary can be reached with the electric vehicle from a current vehicle location and based on a current state of charge of the energy storage device without recharging. Locations of charging stations are then determined in the starting region. For each charging station, the boundary of a region is determined that can be reached indirectly from the respective charging station without further recharging, based on a state of charge that changed when the electric vehicle was recharged. The overall region is composed of the starting region and regions that can be reached indirectly.

6 Claims, 3 Drawing Sheets

(56) References Cited

U.S. PATENT DOCUMENTS

| | | |
|---|---|---|
| 5,790,976 A | 8/1998 | Boll et al. |
| 5,815,824 A * | 9/1998 | Saga et al. ................. 701/22 |
| 2010/0094496 A1* | 4/2010 | Hershkovitz et al. ........ 701/22 |
| 2010/0138098 A1 | 6/2010 | Takahara et al. |
| 2011/0224900 A1* | 9/2011 | Hiruta et al. ................ 701/201 |
| 2011/0288765 A1* | 11/2011 | Conway ...................... 701/201 |
| 2012/0078743 A1* | 3/2012 | Betancourt ................. 705/26.3 |
| 2012/0158229 A1* | 6/2012 | Schaefer ..................... 701/22 |
| 2012/0173061 A1* | 7/2012 | Hanley et al. ............... 701/22 |
| 2012/0173134 A1* | 7/2012 | Gutman ...................... 701/400 |
| 2012/0179359 A1* | 7/2012 | Profitt-Brown et al. ...... 701/123 |
| 2012/0221234 A1* | 8/2012 | Sujan et al. ................. 701/123 |
| 2012/0271547 A1* | 10/2012 | Mori ........................... 701/527 |
| 2013/0046457 A1* | 2/2013 | Pettersson .................. 701/117 |
| 2013/0218458 A1* | 8/2013 | Scholl ......................... 701/426 |
| 2014/0136414 A1* | 5/2014 | Abhyanker ................. 705/44 |

FOREIGN PATENT DOCUMENTS

| | | |
|---|---|---|
| DE | 694 27 327 | 11/2001 |
| DE | 102008037262 | 5/2009 |
| DE | 102009034508 | 1/2011 |
| EP | 1 275 936 | 1/2003 |
| EP | 2 172 740 | 4/2010 |

* cited by examiner

METHOD FOR ASSISTING A PERSON IN PLANNING A JOURNEY WITH AN ELECTRIC VEHICLE, AND MOTOR VEHICLE HAVING A NAVIGATION DEVICE

CROSS-REFERENCES TO RELATED APPLICATIONS

This application is the U.S. National Stage of International Application No. PCT/EP2012/000819, filed Feb. 25, 2012, which designated the United States and has been published as International Publication No. WO 2013/013729 and which claims the priority of German Patent Application, Serial No. 10 2011 108 381.6, filed Jul. 22, 2011, pursuant to 35 U.S.C. 119(a)-(d).

BACKGROUND OF THE INVENTION

The invention relates to a method for assisting a person to plan a journey with an electric vehicle. The invention also includes an electrically drivable motor vehicle with a navigation device.

An electrically drivable motor vehicle, also referred to herein as an electric vehicle, may include a traction battery, referred to as accumulator for storing electrical energy, for operating an electric drive motor. Such traction battery may be permanently installed in the vehicle or designed as a replaceable module. Depending on the design, the traction battery must then be coupled to an electric power source for a certain period of time for charging at a charging station or the discharged traction battery must be replaced with a charged battery.

The route, which an electric vehicle with a fully charged traction battery can travel, is relatively short in relation to the route which a motor vehicle with an internal combustion engine and a full tank is able to travel. Accordingly, the travel must be carefully planned. Navigation devices for motor vehicles have the ability to provide information to an operator in response to a predetermined destination as to whether this destination can be reached with a current state of charge of the traction battery, or when this is not the case, where a charging station for charging the traction battery can be found along the planned route. One such method is relatively simple to implement, since starting from a current location of the vehicle and a given destination, a route can be automatically found on the basis of an appropriate optimization algorithm.

DE 195 19 107 C1 discloses a driving route advisory device for a motor vehicle which in order to reach a given destination, finds an optimal driving route by taking into consideration charging operations for the traction battery. This device has the disadvantage that the driver is forced to actually follow the driving route provided by the device, because he otherwise runs the risk that the vehicle becomes disabled before reaching another charging station.

EP 1 275 936 B1 discloses an information system for a vehicle which displays on a display screen a map, on which in addition to a recommended route to a given destination a detour region is presented, where the vehicle can detour from the recommended route without having to recharge energy until reaching the destination. However, with this information system, the driver must always set a target to find out which detour regions away from the route leading to the destination can still be approached.

If one wants to independently plan a journey and to find in relation to several contemplated driving routes, whether possibly a stopover for recharging the traction battery must be scheduled for these routes, then each of these driving routes must be entered into a navigation device and to note the charging stations specified by the navigation device. This circumstance can be particularly troublesome when several possible alternative routes are contemplated during a journey.

SUMMARY OF THE INVENTION

It is an object of the present invention to technically assist a person planning a journey with an electric vehicle.

The object is attained with a method for assisting a person with planning a tourney with an electric vehicle and with a motor vehicle having a navigation device for carrying out the method.

It is not necessary with the method according to the invention to specify a destination when planning a route. Instead of a single route, information output relating to an overall region is provided to the person (for example, by a navigation device), in which the person can reach driving destinations with a particular electric vehicle. For example, a road map may be displayed on a display screen, on which the total region is identified. Alternatively, a list with reachable locations may be displayed, or a voice output may be generated, for example: "You can reach all places at a distance of up to 265 km".

The total region is determined by the method according to the invention as follows. First, a current location is determined at which the electric vehicle is located. A current state of charge of an energy storage device of the electric vehicle is determined for the current location. This refers to the energy storage device which stores the energy for driving the electric vehicle. A region is then determined for the current information about the location and the state of charge whose boundary can be reached with an electric vehicle from the current location and starting from the current state of charge, without requiring recharging of energy. This region will be referred below as the starting region. Since this relates to planning a journey, the boundary of the starting region can of course only be determined as a prospective boundary, i.e. by assuming a certain driving style of the person. Thereafter, locations of charging stations for electric vehicles will be determined in the starting region then. The information about the locations may be found, for example, in a database, which is part of a commonly used navigation device. The locations may be those of all charging stations in the starting region or of a selection of charging stations. An indirectly reachable region is then determined for each of the determined charging stations. Such region is in turn the region whose boundary can be reached from the charging station and with a state of charge that can be attained by recharging the electric vehicle without requiring additional recharging of energy. The total region finally displayed to the operator, for example, is formed by the starting region and indirectly reachable regions.

The method according to the invention provides the advantage that the operator is now able to detect which region can be reached overall with the electric vehicle, once the electric vehicle has been charged at a charging station. The person can freely select the travel route without running the risk that the vehicle becomes unexpectedly disabled due to a fully discharged traction battery. The invention of course also includes an improved embodiment of the method, wherein for a charging station in an indirectly reachable region an additional indirectly reachable region is determined in a recursive manner. In other words, this additional indirectly reachable region may also include locations that can be reached from the current location only via two charging stations. According to this embodiment, the total region then also includes those other indirectly reachable regions.

In an advantageous embodiment of the method according to the invention, to enable a person to obtain an overview of how often the electric vehicle needs to be recharged so as to be able to travel to the boundary of the displayed overall region in connection with the recursive determination of additional indirectly reachable regions, the person may designate a maximum number of charging stations, via which the boundary of the overall region shall be reachable. For example, the person may define that only that region is displayed as the total region that can be reached with a total of three charging processes. The amount of time required by the person for the recharging processes can thereby be included in the planning.

Whenever an indirectly reachable region is determined for a specific charging station, it is assumed that the electric vehicle is supplied with energy at the charging station. Here, different assumptions can be made. In one embodiment of the method according to the invention, it is assumed that the energy storage device is fully charged or, if the electric vehicle has a replaceable energy storage device, that the energy storage device will be replaced with a fully charged energy storage device. Another embodiment of the method according to the invention assumes that the energy storage device is charged with energy for a predetermined period of time. In this variant of the method, the person can easily define by presetting the charging time how long he wants to stop at a specific charging station, for example, for a rest. Another embodiment of the method according to the invention assumes that the energy storage device is charged at the charging station with energy having a predetermined total price. The person can then define in a convenient manner, how much money he plans to spend for a segment of the route. This can be advantageous when driving through densely populated areas where the price of energy at the charging stations tends to be higher.

A specific determined region, i.e. the starting region or an indirectly reachable region, need not be the same region whose boundary can be reached when the electric vehicle consumes the entire energy stored in the energy storage device. Instead, the line is advantageously determined as the boundary that describes the region connecting all those locations where the state of charge of the energy storage device is expected to meet a predetermined criterion when driving to this location without detours. Accordingly, in an embodiment of the method according to the invention, a determined region may be determined in that the state of charge of the energy storage device has dropped to a predetermined value (for example, ten percent of the maximum amount of energy that can be stored in the energy storage device) upon reaching the boundary of the region. According to another, even safer embodiment of the method, those locations that determine the boundary of the region may be determined based on a criterion that enough residual energy must still be stored in the energy storage device when reaching the location, so that the electric vehicle can reach a charging station proximate to the location under its own power.

It can also be defined in different ways what it means in connection with the determination of an region that the boundary of the region can be reached "without detours" or "directly" and that, for example, ten percent of the maximum capacity should still be available when reaching the boundary. For example, the shortest possible travel time, a most energy-efficient journey or a shortest possible distance may be used.

In another, more advantageous embodiment of the method, zones in the overall region are marked on a displayed map. Particular information relating to the individual zones is identified by the marking. Marking of a zone may by indicative of the number of charging stations required for recharging energy, so that this region can be reached. For example, the starting region may conceivably be displayed on the map very bright, the zones surrounding the starting region that can be reached via a single recharge, in a darker shade and the zones that can be reached only by recharging twice in an even darker shade. It should be noted here that a distinction is made between regions and zones: While the regions necessarily overlap, the zones represent separate partial regions, into which the total region is divided. Each zone is assigned a unique marking. For example, when a certain location is located both in the starting region and in a region that can be reached via a specific charging station (located in the starting region), this location would naturally be associated with directly reachable zone and marked accordingly.

By marking the zones, a charging station may also be identified as an alternative, via which the respective zone can be reached. For example, each charging station may be displayed on the map in a different color, with a zone that can be reached indirectly only via a specific charging station being indicated in the same color as the charging station. If a certain zone can be reached via several charging stations, because the electric vehicle must be recharged repeatedly or because the zone can be reached via multiple charging stations, the zone can be marked based on the charging station where energy needs to be recharged last for reaching the zone. Likewise, the charging station may be used, via which the shortest path leads from the current location into the zone, or via which the zone is expected to be reached in the least amount of time. To allow the person most economical driving, the charging station may be used as a basis, via which the zone can be reached with the least consumption of energy.

In another advantageous embodiment of the method, it becomes easier for a person to spontaneously reschedule his travel route during a journey. This is achieved by repeatedly capturing during a journey the current location and the current state of charge, and by then recalculating the starting region and the regions that can be reached indirectly from the starting region. The information about the overall region, e.g. the display of the road map, will then be updated regularly as a function of the newly identified regions. If the person consumes more energy, for example due to frequent and strong acceleration, than based on the original identification of the starting region, then the starting region will of course shrink thereby and it may no longer be possible to reach all charging stations (and thus also not the regions that can be reached indirectly via these charging stations). By repeatedly determining the boundary of the starting region (and consequently also of the overall region) based on the state of charge that changes while driving, the electric vehicle can continue to be very flexibly navigated even with an unanticipated driving behavior of the person, without the risk for the vehicle to become disabled.

The motor vehicle according to the invention can be driven electrically. A navigation device of the motor car is configured to output information for an overall region formed, based on one of the aforedescribed embodiments of the method according to the invention, of a starting region and of regions that can be reached indirectly by one-time or possibly even repeated recharging. The motor vehicle according to the invention further has a device for detecting the current location of the vehicle, and a device for detecting a state of charge of an energy storage device for its electric drive motor. These two devices can be used to determine the current location or the current state of charge. The remaining steps of the method are performed by the navigation device.

BRIEF DESCRIPTION OF THE DRAWING

The invention will be explained in more detail below with reference to a preferred exemplary embodiment, wherein.

DETAILED DESCRIPTION OF PREFERRED EMBODIMENTS

Figure 1:
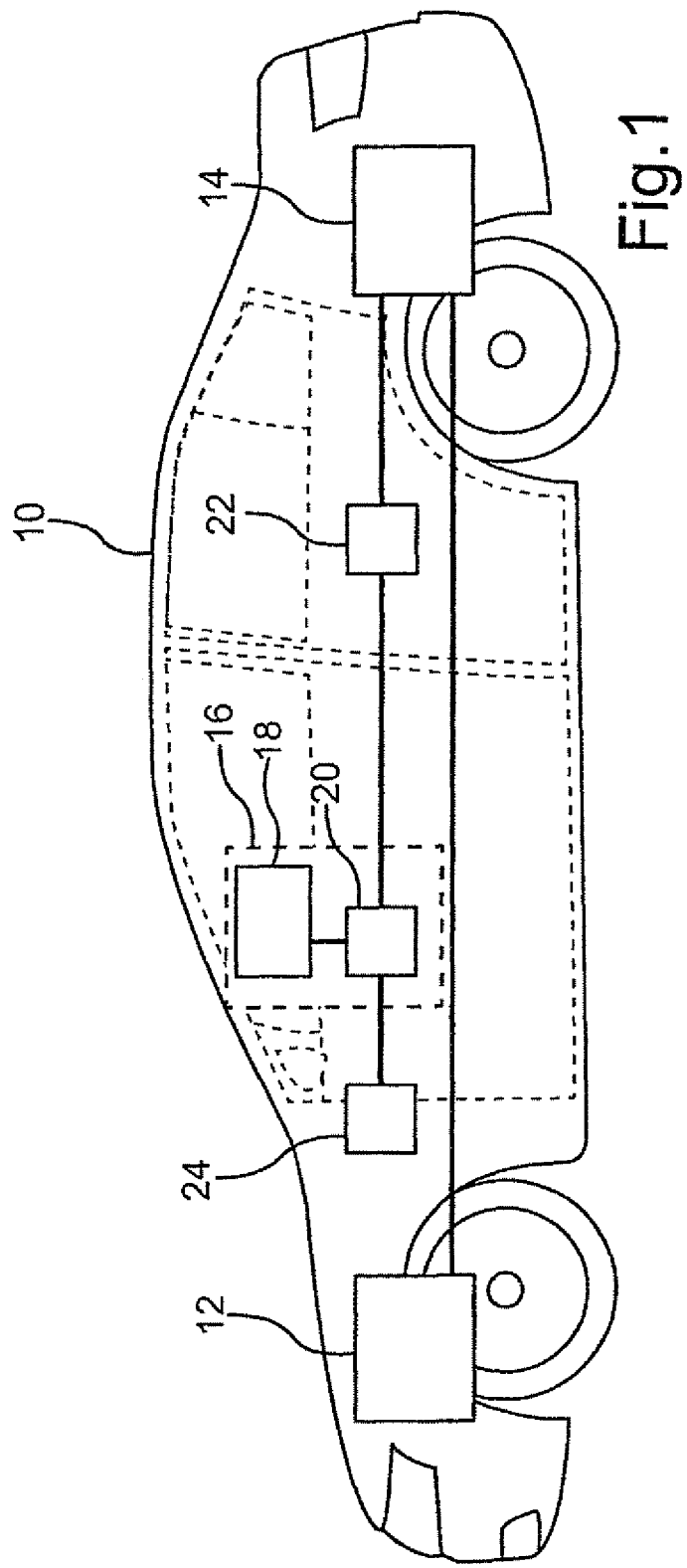
FIG. 1 shows a schematic diagram of a passenger car according to an exemplary embodiment of the motor vehicle according to the invention.

FIG. 1 shows an electrically drivable passenger car 10. The passenger car 10 includes an electric motor 12 for driving the passenger car and a traction battery 14 for supplying electric energy to the electric motor 12. In the event that the traction battery 14 is fully charged, a driver of the passenger vehicle 10 can travel with the traction battery 14 a distance of about 200 km before the energy stored in the traction battery 14 is used up. In the example shown in FIG. 1, the traction battery 14 is discharged to about half.

The driver intends a longer vacation journey with the passenger car 10. He plans to travel on his journey spontaneously to places that come to his mind and in which he is interested. He wants to know which options are available to him. To this end, he turns on a navigation device 16 of the passenger car 10. The driver enters in the navigation device 16 via an (unillustrated) keyboard, that he would like to stay at charging stations where he can charge the traction battery 14 at most twenty minutes in order to rest while the traction battery 14 is being charged.

Figure 2:
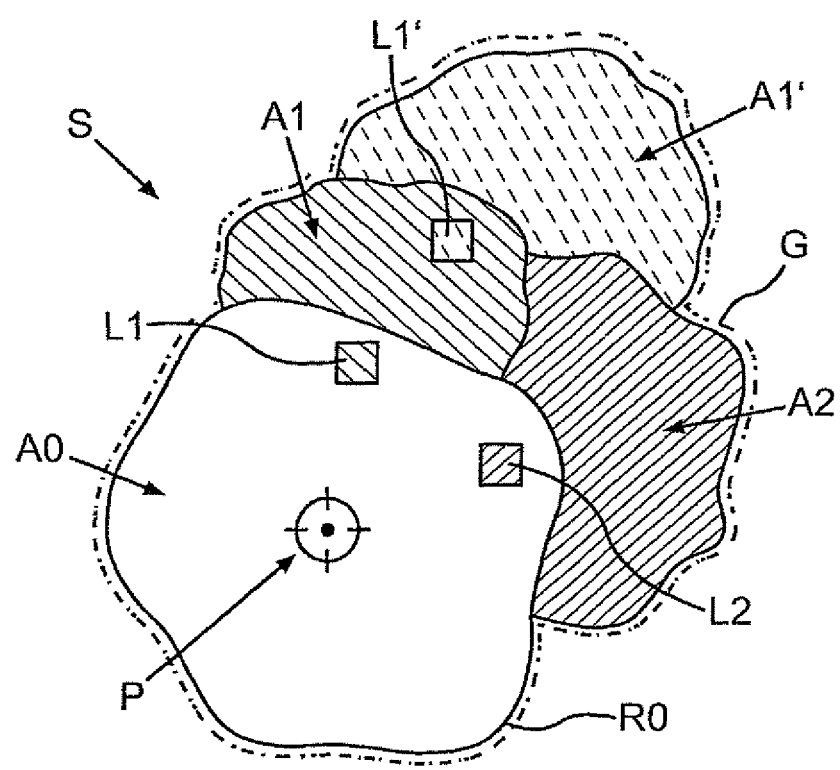
FIG. 2 shows a schematic diagram of a display of a road map on a display screen of the passenger vehicle of FIG. 1.

A road map S is then displayed on a display screen 18 of the navigation device 16 by a control unit 20 of the navigation device 16. The displayed road map S is shown in FIG. 2, wherein an also displayed road network is not shown in FIG. 2 for sake of clarity. A current location P of the passenger car 10 and a zone or region A0 are marked on the map S, wherein the driver could reach the boundary R0 with the amount of energy still stored in the half-full traction battery 14 before having to approach a charging station. The locations of two charging stations L1 and L2 are displayed in the region A0. A zone or region A1 for the charging station L1 beyond the region A0 that can be easily reached by the driver with the passenger car 10 is highlighted on the road map S, when the traction battery 14 is charged at the charging station L1 for a duration of twenty minutes. Commensurately, a region A2 is highlighted that can be reached via the charging station L2.

The two charging stations L1 and L2 are marked differently on the road map S. In the example shown in FIG. 2, these are different hatchings, but may also be, for example, different colors or different shades of the same color. The region A1 is marked in the same way as the charging station L1, the region A2 in the same way as the charging station L2. This indicated to the driver which charging station L1, L2 he needs to approach in order to reach the respective region A1, A2. Another charging station L1' whose location is also shown on the road map S is located in the region A1. If the driver wants travel to a region A1' highlighted on the road map S, then the identical marking of the charging station L1' and of the region A1' alert the driver that he needs to once more charge the traction battery 14 in the charging station L1'.

Depending on the condition specified by the driver, namely that the charging time must take no more than twenty minutes, an overall region G can be reached. The roads located outside the region G are shown in dark on the displayed road map S.

For determining the region G on the road map S, the control unit 20 has received information about the remaining amount of energy from a monitoring device 22 for the traction battery 14 via a communication bus of the passenger car 10. The control unit 20 is further connected with a GPS receiver 24 (GPS—Global Positioning System), from which it has received information about the current position P of the passenger car 10.

Based on the current position P and the current state of charge of the traction battery 14, a route is first calculated by the control unit 20, assuming a given average energy consumption per unit of distance along the route that can be traveled by the passenger car 10 with the remaining energy of the traction battery 14. A reserve is also taken into consideration: When the end of the calculated route is reached, the traction battery 14 would not be completely empty, but is instead be emptied down to only ten percent of their maximum charge capacity. The control unit 20 has then determined from an (unillustrated) database of the navigation device 16 all the paths along roads starting at the current position P and having a length that corresponds to the calculated route. The boundary R0 is obtained by connecting all those locations where a respective one of the determined paths ends.

Figure 3:
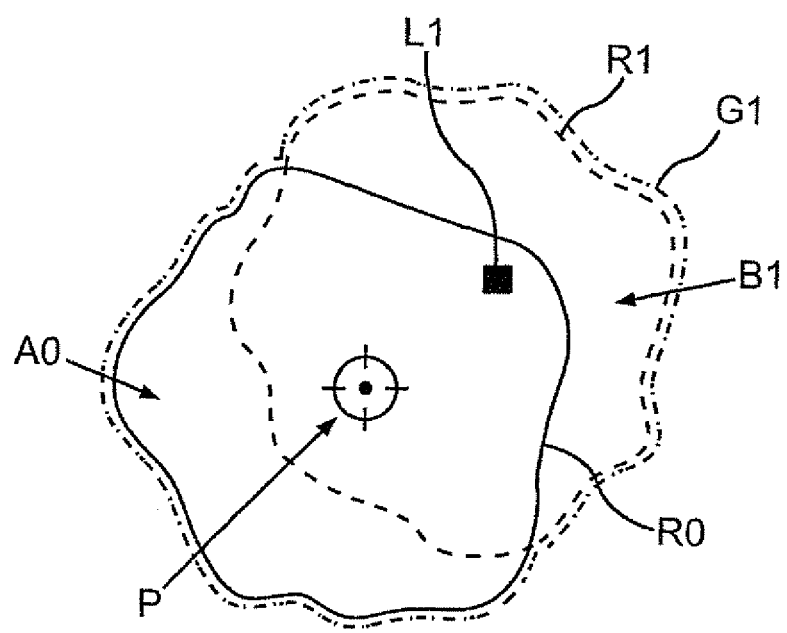
FIG. 3 shows a schematic diagram of an embodiment of the method according to the invention, as performed by the passenger car of FIG. 1.

It will now be described with reference to FIG. 3, how the indirectly reachable region A1 was determined by the control unit 20 starting from the region A0. FIG. 3 shows once more the current location P, the boundary R0 and the region A0. However, this is not the displayed information, but instead a representation of the information by data in a memory of the control unit 20. The control unit 20 has determined from the database information that the charging station L1 is in the region A0. Based on the charging time of twenty minutes set by the driver, the control unit determines a boundary R2 of a region B1 that could be reached from the charging station L1 via the road network after charging. The portion of the region B1 located outside of the region A0 then forms the region A1.

A total region G is obtained by combining the region A0 and region B1, from which the control unit then recursively determines other regions, from which in turn the region A2 and the region A1' result.

When the driver now starts to drive off with the passenger car 10, the current position P of the passenger car 10 is continuously updated by the control unit 20 on the road map S displayed on the displays screen 18. For this purpose, the control unit 20 receives at regular intervals information about the current position P from the GPS receiver 24. In addition, the region A0 and the regions that can be reached from the region A0 is determined based on additional information from the monitoring device 22 and displayed on the road map S.

The driver is thus given the opportunity, to navigate the passenger car 10 independent of a destination planning, without risking that the passenger car becomes disabled due an empty traction battery 14.

The invention claimed is:

1. A method for assisting a person with planning a journey with an electric vehicle, comprising:

acquiring a current vehicle location at which the electric vehicle is located;

acquiring a current state of charge of an energy storage device of the electric vehicle, which stores energy for a drive motor of the electric vehicle;

determining a starting region having a first boundary that is within reach of the electric vehicle from the current vehicle location and based on the current state of charge without recharging energy;

determining locations of charging stations for the electric vehicle in the starting region;
for each of the charging stations, determining an indirectly reachable region having a second boundary that is within reach from a respective charging station and based on a state of charge that was changed at the respective charging station in a predetermined manner, without additional recharging;
determining, in a recursive manner, for an additional charging station in the indirectly reachable region an additional indirectly reachable region, whose boundary is within reach from this additional charging station and based on a state of charge that was changed at the additional charging station in a predetermined manner, without additional recharging,
outputting information for an overall region formed by the starting region and the indirectly reachable regions, wherein for outputting the information a road map is displayed, on which the overall region is indicated,
marking zones in the overall region indicated on the road map, with markings of the zones indicating:
a) a minimum number of charging stations required for recharging energy in order to reach the respective zone, or
b) at least one of the charging stations or the additional charging station, via which a respective zone can be reached, wherein when a zone can be reached via a plurality of the charging stations, using the charging station
  where energy needs to be recharged last to reach the respective zone, or
  via which the shortest path leads from the current vehicle location to the respective zone, or
  via which the respective zone can be reached in the least amount of time, or
  via which the respective zone can be reached with lowest energy consumption.

2. The method of claim 1, wherein the person receives a predefined maximum number of charging stations, via which a boundary of the overall region can be reached.

3. The method of claim 1, wherein the indirectly reachable region is determined such that at the charging station for which the indirectly reachable region is determined by
fully charging the energy storage device, or replacing the energy storage device located in the electric vehicle with a fully charged energy storage device, or
charging the energy storage device with energy for a predetermined time, or
charging the energy storage device with energy according to a predetermined total price.

4. The method of claim 1, further comprising:
for determining the boundary of the starting region or of the indirectly reachable region, determining a location where the state of charge of the energy storage device is expected to meet a predetermined criterion indicating that the state of charge has dropped to a predetermined value or that enough residual energy is still stored in the energy storage device upon reaching the location, so that a charging station closest to the location is within reach of the electric vehicle under its own power.

5. The method of claim 1, further comprising:
repeatedly measuring the current vehicle location and the current state of charge during travel of the electric vehicle,
newly determining the starting region and the indirectly reachable regions, and
updating the information as a function of the newly determined regions.

6. A motor vehicle, comprising:
a device for acquiring a vehicle location at which the motor vehicle is located,
a device for acquiring a state of charge of an energy storage device supplying energy to an electric drive motor of the motor vehicle, and
a navigation device which is configured to
determine a starting region having a first boundary that is within reach of the electric vehicle from the current vehicle location and based on the current state of charge without recharging energy;
determine locations of charging stations for the electric vehicle in the starting region;
for each of the charging stations, determine an indirectly reachable region having a second boundary that is within reach from a respective charging station and based on a state of charge that was changed at the respective charging station in a predetermined manner, without additional recharging;
determine, in a recursive manner, for an additional charging station in the indirectly reachable region an additional indirectly reachable region, whose boundary is within reach from this additional charging station and based on a state of charge that was changed at the additional charging station in a predetermined manner, without additional recharging,
output via an output device of the navigation device information about an overall region formed by the starting region and the indirectly reachable regions, wherein for outputting the information a road map is displayed, on which the overall region is indicated,
mark zones in the overall region indicated on the road map, with markings of the zones indicating:
a) a minimum number of charging stations required for recharging energy in order to reach the respective zone, or
b) at least one of the charging stations or the additional charging station, via which a respective zone can be reached, wherein when a zone can be reached via a plurality of the charging stations, using the charging station
  where energy needs to be recharged last to reach the respective zone, or
  via which the shortest path leads from the current vehicle location to the respective zone, or
  via which the respective zone can be reached in the least amount of time, or
  via which the respective zone can be reached with lowest energy consumption.

* * * * *